US009733560B2

(12) United States Patent
Decock

(10) Patent No.: US 9,733,560 B2
(45) Date of Patent: Aug. 15, 2017

(54) CURVED PROJECTION SCREEN

(71) Applicant: BARCO N.V., Kortrijk (BE)

(72) Inventor: Johan Decock, Zwevegem (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 15/308,006

(22) PCT Filed: May 7, 2015

(86) PCT No.: PCT/EP2015/060028
§ 371 (c)(1),
(2) Date: Oct. 31, 2016

(87) PCT Pub. No.: WO2015/169889
PCT Pub. Date: Nov. 12, 2015

(65) Prior Publication Data
US 2017/0052438 A1 Feb. 23, 2017

(30) Foreign Application Priority Data

May 8, 2014 (GB) .................................. 1408159.0

(51) Int. Cl.
*G03B 21/58* (2014.01)
*G03B 21/606* (2014.01)
*F16M 13/00* (2006.01)

(52) U.S. Cl.
CPC ........... *G03B 21/58* (2013.01); *G03B 21/606* (2013.01); *F16M 13/00* (2013.01)

(58) Field of Classification Search
CPC ................................. G03B 21/58; G03B 21/56
USPC ................................................. 359/451, 461
See application file for complete search history.

(56) References Cited

U.S. PATENT DOCUMENTS

| 2,888,072 A | 5/1959 | Nicholas |
| 3,037,424 A | 6/1962 | Capetta |
| 3,054,325 A * | 9/1962 | Crockwell ............. G03B 21/58 160/183 |
| 3,348,897 A | 10/1967 | Hourdiaux |
| 3,998,522 A | 12/1976 | Holzel |
| 4,022,522 A | 5/1977 | Rain |
| 5,724,775 A | 3/1998 | Zobel, Jr. et al. |
| 6,501,599 B1 | 12/2002 | Randolph et al. |
| 6,712,477 B2 | 3/2004 | Idaszak et al. |
| 7,364,310 B2 | 4/2008 | Yamazaki |

(Continued)

FOREIGN PATENT DOCUMENTS

| CN | 2932438 Y | 8/2007 |
| DE | 202010010853 U1 | 10/2010 |
| WO | 2007/041646 A2 | 4/2007 |

OTHER PUBLICATIONS

International Search Report (ISR) dated Jul. 31, 2015, for PCT/EP2015/060028.

(Continued)

*Primary Examiner* — Christopher Mahoney
(74) *Attorney, Agent, or Firm* — Bacon & Thomas, PLLC

(57) ABSTRACT

A curved projection screen having a one-piece seamless substrate having a three-dimensional curvature. The screen is arranged for being bent to a certain degree around one of its axes so that the smallest deformation of the screen is elastic, where the edge of the screen has been shaped so that its deformation during the above mentioned degree of bending is also elastic.

24 Claims, 4 Drawing Sheets

(56) References Cited

U.S. PATENT DOCUMENTS

| | | | |
|---|---|---|---|
| 7,766,483 B2 | 8/2010 | Balu et al. | |
| 2004/0212879 A1* | 10/2004 | Imade | G03B 21/60 359/451 |
| 2016/0216601 A1* | 7/2016 | Ducasteele | G03B 21/10 |

OTHER PUBLICATIONS

Written Opinion dated Jul. 31, 2015, for PCT/EP2015/060028.
International Preliminary Report on Patentability (IPRP) dated May 13, 2016, for PCT/EP2015/060028.
British Search Report dated Oct. 21, 2014, for GB 1408159.0.
Housing Standards Review—Illustrative Technical Standards Developed by the Working groups from the UK Department for Communities and Local Government dated Aug. 2013.
Compilation of ASTM standard definitions, Fourth Edition, 1979.

* cited by examiner

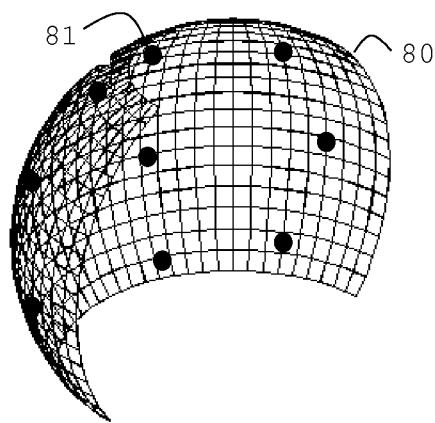
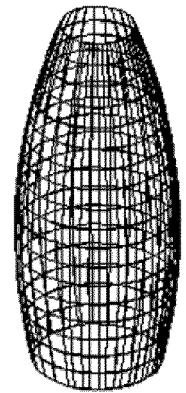
Figure 9a)
Figure 9b)
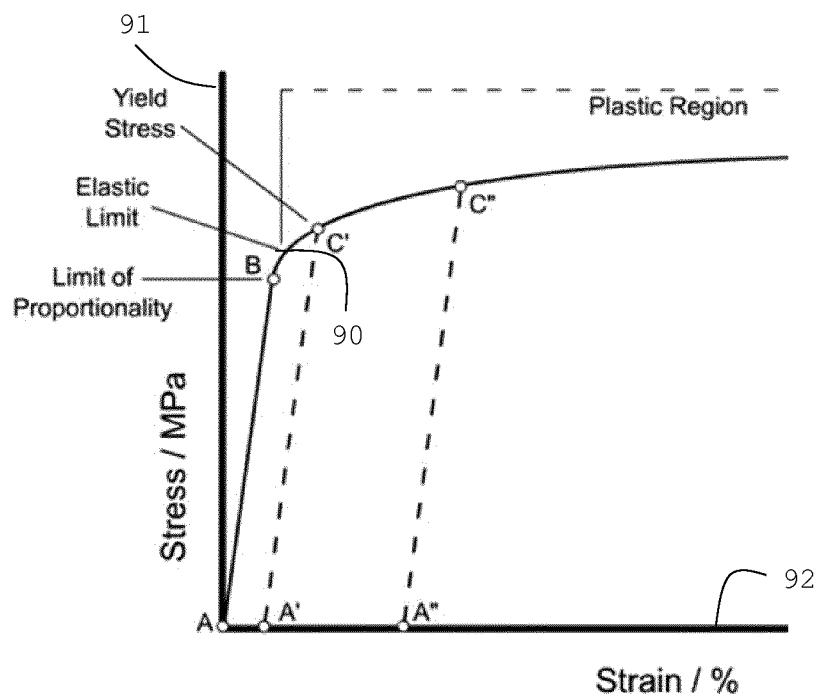
Figure 10

CURVED PROJECTION SCREEN

BACKGROUND OF THE INVENTION

The present invention relates to curved projection screens, in particular projection screens that are curved in three dimensions.

Projection screens that are shaped like a sphere or part of a sphere, so-called dome screens or immersive screens, can be used in a variety of fields, such as simulation, training, high end gaming, immersive display for virtual and augmented reality, etc. It is crucial for the quality of the projected image to have a smooth and bulge-free surface in order to provide a high image quality. This can be obtained by implementing the screen in a rigid material that resist deformation that could arise from draft, non-uniform tension between fixation points, its own weight etc. It is common to implement such rigid screens by dividing them into smaller segments, in order to facilitate logistics. In this way it is possible to use standard trucks or containers to carry the screen, or to be able to pass through a standard door or window when bringing the screen into a building. The dimensions of the opening width of a "standard door" are typically in the range 750 to 800 mm. For example, the Housing Standards Review—Illustrative Technical Standards Developed by the Working groups from the UK Department for Communities and Local Government dated August 2013 details requirements for communal entrances, both internal and external A communal entrance door to a building containing flats (or other dwelling types served by a communal entrance or doors) should have a clear opening width of at least 800 mm. All external gates, openings or doorways within an approach route should provide a minimum clear opening width of 850 mm. Secondary entrance doors, for example within a lobby or porch, should provide a minimum clear opening width of 800 mm. For a private entrance area a door should have a clear opening width of at least 800 mm. The doorway to any habitable room, the kitchen, and the room containing the WC should provide a minimum clear opening width of 750 mm.

At the installation site, the screen is mounted by putting the segments together. A visible seam between the screen segments would disturb the projected image, therefore these seems are concealed with additional fill up and painting. To assemble and finish the screen surface on-site requires a substantial amount of labour and equipment. The final coatings or paints should also be applied by specially trained people.

U.S. Pat. No. 5,724,775 discloses a multi-pieced portable projection dome that is constructed from a plurality of rigid panels.

U.S. Pat. No. 6,712,477 discloses a non-deployable hemispherical projection dome.

CN2932438 discloses a method of manufacture of a cylindrical rollable projection screen.

SUMMARY OF THE INVENTION

The present invention therefore seeks to provide a screen that can be curved in three dimensions and that is suitable for high quality image projection. The screen comprises a one-piece seamless curved substrate that can be rolled or bent for better suiting logistic requirements. The edge of the screen is shaped so that it can deform elastically when the screen is bent to a certain degree.

According to an aspect of the present invention there is provided a curved projection screen comprising a one-piece seamless substrate having a three-dimensional curvature. Said screen is arranged for being bent to a certain degree around one of its axes so that the smallest deformation of the screen is elastic, wherein the edge of said screen has been shaped so that its deformation during the above mentioned degree of bending is also elastic.

In one aspect the present invention provides a curved projection screen comprising a self-supporting seamless substrate, having a three-dimensional curvature and with at least one pair of truncations on two opposing truncated edges, each pair being positioned at the ends of an axis, wherein said screen is rolled around one of the axes so that the smallest diameter of the screen in its rolled state is about 30% of the diameter in its deployed state.

The shape depends on the degree of bending. This shape can comprise at least two truncations of the curved surface whereof two truncations are placed opposite to each other and perpendicular to the axis of bending. In this way the radius of curvature in the bended state is increased and the deformation and corresponding induced stress is decreased so that it is elastically deformed. Further can the substrate be coated, before shipping and installation, with at least one optical coating on the concave or convex surface or on both surfaces. This avoids the additional step of applying the coating at the installation site.

According to another aspect of the invention there is provided a curved projection screen comprising a one-piece seamless substrate having a three-dimensional curvature. Said screen is arranged for being bent to a certain degree around one of its axes so that the smallest deformation of the screen is elastic, wherein the edge of said screen has been shaped so that its deformation during the above mentioned degree of bending is also elastic.

Said screen has means for fastening attached along a surface that is not intentionally displaying a projected image, for example on the backside of a front projecting screen, or along the edge on a rear-projecting screen. The means for fastening can be magnets or Velcro or screws, any combination thereof or any other type of fastening. With the means for fastening, the screen can be attached to a supporting frame, to make sure the shape of the screen stays as intended.

According to another aspect of the invention there is provided a curved projection screen comprising a one-piece seamless substrate having a three-dimensional curvature. Said screen is arranged for being bent to a certain degree around one of its axes so that the smallest deformation of the screen is elastic, wherein the edge of said screen has been shaped so that its deformation during the above mentioned degree of bending is also elastic.

Said screen has a plurality of alignment magnets attached to the backside of the screen. Reference magnets can then be placed on the displaying side of the screen so that they are attracted to the alignment magnets and attached to the screen. This provides a non-electrical and simple method for obtaining reference points for the alignment of the projected images.

A removal magnet, being larger and stronger than the reference magnet can be positioned on top of the reference magnet to remove it.

BRIEF DESCRIPTION OF DRAWINGS

FIG. 9a shows an embodiment of the present invention where an alignment aid is provided by means of magnets. FIG. 9b shows an embodiment of the present invention rolled to a cigar shape FIG. 10 shows a stress-strain diagram.

DETAILED DESCRIPTION OF THE INVENTION

Figure 1:
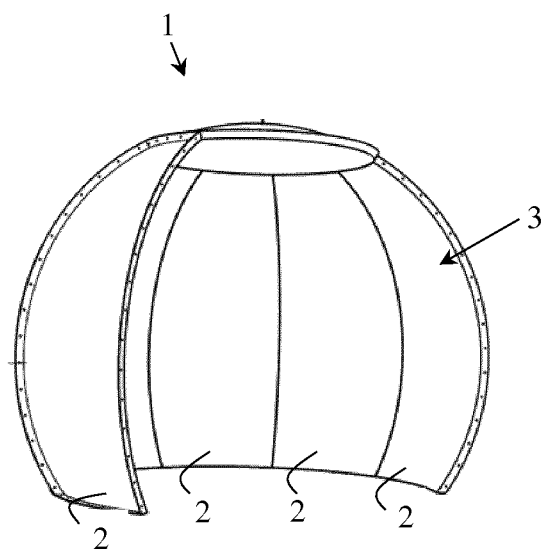
FIG. 1 shows a segmented curved display screen.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

FIG. 1 shows an example of a curved rigid display screen 1 made out of different rigid segments 2 that are attached together, for example by glue and bolts. The curved rigid display screen 1 can be in the form of a dome or part dome, i.e. exhibiting at least a portion thereof having a three-dimensionally curved surface such as a spheroidal or spherical surface. To hide the seams on the inside display surface 3 a paint or coating can be applied on top of the assembled segments. This final coating is preferably applied at the site of installation, and is thus an expensive and time consuming solution.

Figures 2A, 2B:
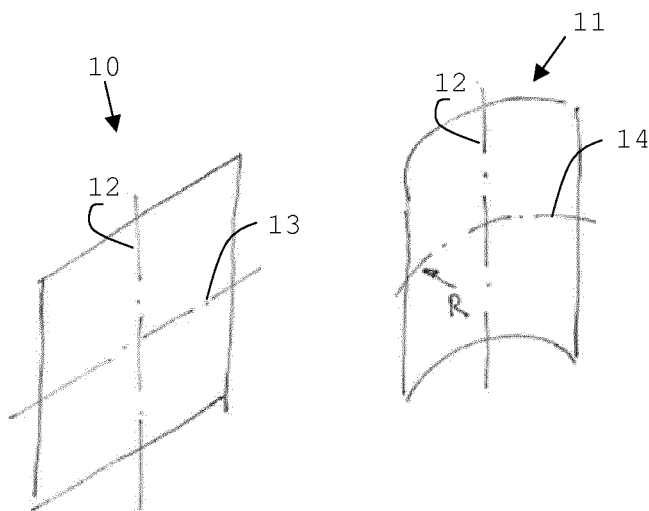
FIG. 2a shows a plane sheet bent into a cylindrical shape, as seen in FIG. 2b.

FIG. 2a illustrates a thin flat sheet 10 extending along the axes 12 and 13, which are perpendicular and cross each other in the center of the sheet 10. As seen in FIG. 2b the sheet 10 is then curved around the axis 12 and a cylindrical surface 11 is obtained. The line 14 (centered) is curved with a radius of curvature R.

Figures 3A, 3B:
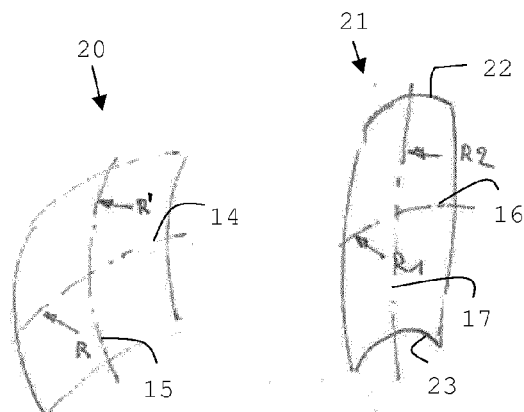
FIG. 3a shows a sheet curved in three dimensions and FIG. 3b shows the sheet then bent along one of its axes.

FIGS. 3a and 3b illustrate how the surface 11 is curved around an axis parallel to 13 so that a three-dimensionally curved surface 20 is obtained. The line 14 is curved with radius of curvature R and axis 15 (centered) is curved with radius of curvature R'. If the curved surface 20 is now rolled around an axis parallel to 12 the result is a cigar shaped volume 21 with two lines 16 and 17 with radiuses of curvature R1 and R2 respectively. Note that R1 will be different from R and R2 will be different from R'.

The stress experienced by surface 11 will be substantially the same along the line 12 since the radius of curvature is the same. The stress experienced by volume 21 will be higher at the edges 22 and 23 since the radius of curvature is smaller at those edges than at the line 16. FIG. 10 illustrates a stress 91 strain (or deformation) 92 diagram with the elastic limit 90. If the edges 22 and 23 are submitted to a stress higher than the elastic limit 90, the material will enter the plastic region and deform and/or break. At this moment, the material in the vicinity of line 16 may still deform elastically. The number t of degrees a sheet can be bent or rolled will thus depend on its geometrical- and material characteristics.

The materials of interest for the present invention need to be rigid enough to sustain their pre-formed rounded shape, even without support. Such a material has a high E-modulus, thus the stress 91 increases fast with the strain or deformation 92. Such a material may be a rigid plastic having a modulus of elasticity either in flexure or in tension greater than 700 MPa at 23° C. and 50% humidity, when tested in accordance with ASTM methods D747, D790, D 638, or D 882 (see Compilation of ASTM standard definitions, Fourth Edition 1979). The flexibility of a material is determined by a combination of its modulus in bending or tension, its thickness and its extension at break. However as weight is an important characteristic for handling a transport a higher modulus of a thinner material can be preferable. Thus the present invention allows a variety of combinations of material properties such as thickness, bending or tensile modulus and extension at break.

An example of a suitable material is given in this table:

| Property | Test standard | Value |
| --- | --- | --- |
| Bending modulus | ISO 178 | 8.3 GPa |
| Bending strength | ISO 178 | 235.1 MPa |
| Tensile strength | ISO 527 | 91.8 MPa |
| Extension at break | ISO 527 | 6.64% |
| Weight | | 1 layer of 450 g/m$^2$ |
| Thickness | | 2 ± 0.5 mm |

Figures 4A, 4B:
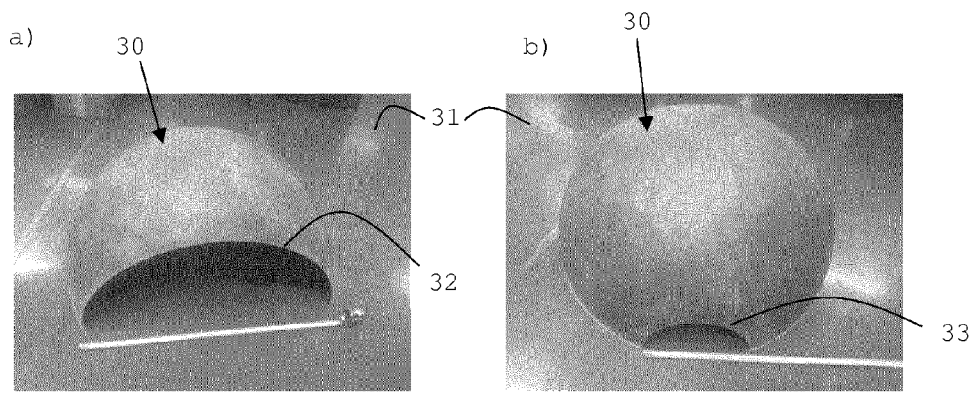
FIGS. 4a and 4b show an embodiment of the present invention where the curved display has two truncations opposite each other.

The standards refer to those applicable on 16 Sep. 2013. A suitable thickness range can be between 1.5 and 5 mm average. If a sheet of such a material is very heavily curved, for example having the shape of a complete semi-sphere, it is not possible to bend it around its centre axis without breaking it. The deformation and the associated stress rapidly rises to values higher than the elastic limit 90. A remedy is to cut out a piece of material of the sphere, as shown at 32 and 33 in FIGS. 4a and 4b so that the radius of curvature in its deformed shape is increased. This will reduce the deformation and the associated induced stress so that the stresses experienced at the positions indicated by 32 and 33 will remain within the elastic range. In principle this remedy is also valid for a curved screen that is not perfectly spherical but has more than one radius of curvature.

A related remedy is to use a smaller field or fields of view 40 and/or 41 of the screen, vertically and/or horizontally (see FIG. 5).

Figures 5A, 5B:
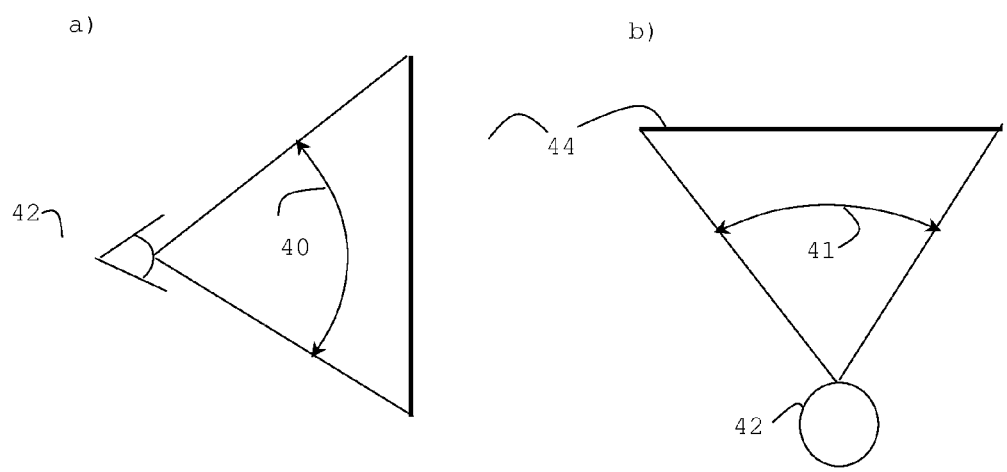
FIG. 5a shows an example of a vertical-filed of view and FIG. 5b shows a horizontal field of view.

FIGS. 5a and 5b illustrate the field of view of an image. The field of view can be described as an angle between the lines originating from the observer to the edges of the image. It is described for the vertical, horizontal and sometimes diagonal extent of the image. FIG. 5a illustrates the vertical field of view 40 of a flat object 44 experienced by the observer 42 and FIG. 5b illustrates the horizontal field of view 41 for the flat object 44 experienced by the observer 42. The line of sight 43 can be used to differentiate between the positive vertical (above) and negative vertical (below) field of view. In two- and three dimensions the line of sight will be a line or a curve respectively and can be called the horizon. The human limit for the total vertical field of view 40 is about 135 degrees. The distribution of the field of view does not have to be symmetrical around the reference line 43 (or the horizon). In one embodiment of the present invention, the horizontal field of view of the screen is at least 75 degrees and the vertical field of view of the screen is at least 75 degrees.

Figure 6:
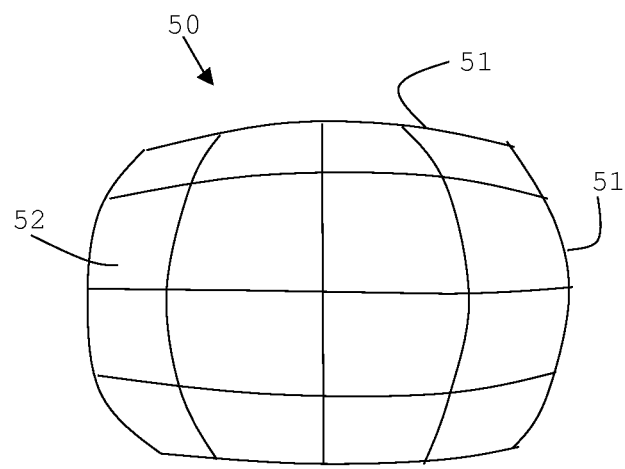
FIG. 6 shows a support structure where a curved screen can be attached.

With embodiments of the present invention it is possible to have a pre-coated seamless screen that is easy to bring into a building and is fast to install. The installation can comprise the steps of deploying the screen and inserting it into a supporting frame 50 as shown schematically in FIG. 6, with means of fastening. As shown in FIG. 6, the support is built up of elongated structures 51 leaving empty spaces 52 between and should not be limited to the layout in FIG. 6. The means of fastening can be for example magnets, hook and loop fasteners such as Velcro, or screws, but should not be limited hereto. The means of fastening may be distributed over the surface of the screen that is not used for intentionally displaying an image, hereafter referred to as the non-displaying surface. The means for fastening can also be applied along the edges of the screen, for example directly attached on the screen. Alternatively there can be part of the support structure placed so that it clamps the screen edge and the means for fastening is fixing this clamp to the screen. It is then possible to apply the means for fastening only along the edges of the screen. A mixture of the two is also possible. Fastening the screen provides further stability and assures the projection surface remains in its intended shape.

Figure 7:
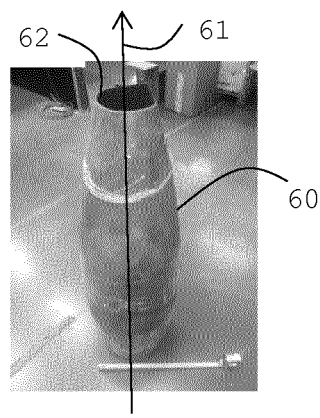
FIG. 7 shows an embodiment of the present invention in a rolled-up state.

FIGS. 7 and 9a and b show how the screen can be rolled whereby a reduction can be achieved from 240 cm to 750 mm, which fits into or passes through a standard door. FIG. 7 and FIG. 9b show an embodiment of the present invention where the curved display screen 30 is rolled up around one of its vertical axes, 61, into a cigar-like shaped roll 60. The diameter in the rolled-up state can be significantly decreased. For a smaller sized display it can be possible to pass through a standard door, e.g. having a width of clear space of at least 750 mm or at least 800 mm. For example, if the screen has a deployed diameter of about 240 cm it could be rolled-up to a diameter of about 750 mm which is consistent with the above dimensions of at least 750 mm, e.g. at least 800 mm. But larger screens with for example diameters like 500 cm can also be rolled in order to decrease the diameter. These should, however, not be seen as limiting examples.

Figure 8:
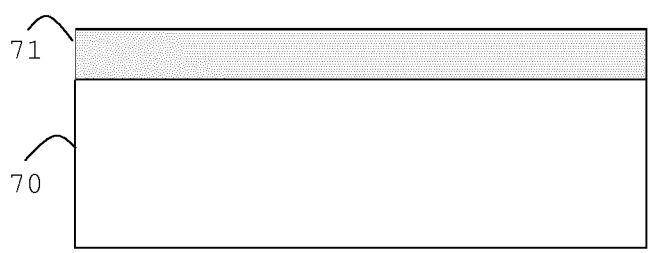
FIG. 8 shows a cross section of an embodiment of the present invention.

FIG. 8 shows a cross section of an embodiment of the present invention. The curved display screen can be used for front- or rear projection. For a rear-projection screen the substrate 70 has to be transparent for visible light and the optical coating 71 can be designed to diffuse the transmitted light. For a front projection screen the substrate 70 can be transparent or non-transparent. The coating 70 may for front projection be a reflective coating. It is also possible to have coatings on both sides of substrate 70 (not shown here). The screen substrate can be implemented with various types of materials, for example glass fiber reinforced plastics or polycarbonate or any other transparent light weight material for the rear-projection embodiment. For the front projection embodiment it is also possible to use non-transparent materials like steel, aluminum or other alloys, or any other material that would give a light weight screen.

FIG. 9a shows an embodiment of the present invention intended for front projection. Magnets 81 (only one indicated) are distributed over the non-displaying screen surface 80. These magnets will be referred to as alignment magnets. When the screen is installed, additional magnets, referred to as reference magnets (not shown), can be attached to the screen at the location of the reference magnets. For example a plurality of alignment magnets can be pre-mounted on the backside of the screen. If several images are tiled, these magnets can be used as reference points during the alignment of the projectors. After the alignment is done, a magnet that is bigger and stronger than one of the reference magnets can be used for the removal of the reference magnets. For example neodymium magnets can be used, or any other strong type of magnet. In contrast to additional complex electrical equipment for alignment, this is a simple and fast solution.

The invention claimed is:

1. A curved projection screen comprising a self-supporting seamless substrate, having a three-dimensional curvature and with at least one pair of truncations on two opposing truncated edges, each pair being positioned at the ends of an axis, wherein said screen is rolled around one of the axes so that the smallest diameter of the screen in its rolled state is about 30% of the diameter in its deployed state.

2. The curve projection screen according to claim 1 wherein the truncations on opposing sides along at least one axis are of different length.

3. The curved projection screen according to claim 1 wherein an optical coating is deposited onto the screen on a concave or convex surface or on both surfaces.

4. The curved projection screen according to claim 1 wherein the screen comprises means for fastening attached along a non-displaying part of the screen.

5. The curved projection screen according to claim 4 wherein the means for fastening are magnets or hook and loop fasteners or screws or any combination thereof.

6. The curved projection screen according to claim 1 wherein the substrate is made out of glass fiber reinforced plastics or polycarbonate or a light-weight metal.

7. The curved projection screen according to claim 1 wherein a plurality of alignment magnets are pre-mounted on the backside of the screen.

8. The curved projection screen according to claim 7 wherein a plurality of reference magnets are placed on the displaying side of the screen at positions corresponding to the alignment magnets, so that the reference magnets attracts the alignment magnets which are hereby attached to the screen.

9. The curved projection screen according to claim 8 wherein a removal magnet, which is larger and stronger than the reference magnet, is positioned on top of a reference magnet.

10. The curved projection screen according to claim 1 comprising neodymium magnets.

11. A method for transporting and installing a curved projection screen according to claim 1, the method comprising the steps of,
    at the site of departure, rolling said screen around one of its axes,
    carrying said screen through at least one standard door,
    un-rolling said screen at the site of destination, and
    installing said screen in a supporting frame with help of means for fastening.

12. The method for transporting and installing a curved projection screen according to claim 11 wherein the step of installing comprises the steps of:
    placing reference magnets on the displaying side of the screen on positions corresponding to pre-mounted alignment magnets positioned on the backside of the screen, using the reference magnets as reference points when aligning the corresponding projection source, and placing a removal magnet on a reference magnet and removing the reference magnet from the screen.

13. A method for transporting and installing a curved projection screen according to claim 1 having a deployed state and a rolled-up state, the method comprising the steps of:

at the site of departure, rolling said screen around one of its axes, the diameter of its rolled-up state being 30% of the diameter of its deployed state, un-rolling said screen at the site of destination, and installing said screen in a supporting frame with help of means for fastening.

14. The method for transporting and installing a curved projection screen according to claim 13 wherein the step of installing comprises the steps of:

placing reference magnets on the displaying side of the screen on positions corresponding to pre-mounted alignment magnets positioned on the backside of the screen, using the reference magnets as reference points when aligning a corresponding projection source, and placing a removal magnet on a reference magnet and removing the reference magnet from the screen.

15. A curved projection screen comprising a one-piece seamless substrate, said substrate being pre-formed into a three-dimensional curvature with at least one axis of bending, and said screen having truncations on opposing sides along at least one axis of bending, and further having a deployed state and a rolled-up state, wherein the diameter of its rolled-up state is 30% of the diameter of its deployed state.

16. The curve projection screen according to claim 15 wherein the truncations on opposing sides along at least one axis are of different length.

17. The curved projection screen according to claim 15 wherein an optical coating is deposited onto the screen on a concave or convex surface or on both surfaces.

18. The curved projection screen according to claim 15 wherein the screen comprises means for fastening attached along a non-displaying part of the screen.

19. The curved projection screen according to claim 18 wherein the means for fastening are magnets or hook and loop fasteners or screws or any combination thereof.

20. The curved projection screen according to claim 18 wherein the substrate is made out of glass fiber reinforced plastics or polycarbonate or a light-weight metal.

21. The curved projection screen according to claim 18 wherein a plurality of alignment magnets are pre-mounted on the backside of the screen.

22. The curved projection screen according to claim 21 wherein a plurality of reference magnets are placed on the displaying side of the screen at positions corresponding to the alignment magnets, so that the reference magnets attracts the alignment magnets which are hereby attached to the screen.

23. The curved projection screen according to claim 22 wherein a removal magnet, which is larger and stronger than the reference magnet, is positioned on top of a reference magnet.

24. The curved projection screen according to claim 18 comprising neodymium magnets.

\* \* \* \* \*